Patented Dec. 4, 1934

1,983,272

UNITED STATES PATENT OFFICE 1,983,272

PROCESS FOR THE PURIFICATION OF SAND

Theodore Earle, Denver, Colo.

No Drawing. Application December 15, 1930,
Serial No. 502,628. Renewed April 10, 1934

12 Claims. (Cl. 252—8)

My invention relates to a process for cleaning sand for glass manufacture and more especially to a process by which the greater part of the iron content may be removed from sand for glass manufacture.

In some localities perfectly white, clean, sand beds are found, the sand of which is so clean that it requires little or no treatment whatever before its use in the manufacture of glass.

There are other localities, however, so far from such clean sand beds that the freight cost makes the use of such sand impossible with the present price of glass.

To make the manufacture of glass possible in such unfavored localities, the local sand is treated and cleaned, by which means a sand is obtained at a much lower price than would have to be paid for the shipped-in clean sand.

But, this cleaned and treated sand, though it is used for the manufacture of an inferior quality of glass, is still too impure to make glass of the highest quality.

In the treatment of this local sand, the following method is used; the sand is first washed by various methods and systems, which washing apparently cleans the sand of all but some iron stain or particles. The washed sand is then mixed with a dilute acid and allowed to leach for some time.

The leached sand is then washed again, which removes the acid and that portion of the iron which has meantime been dissolved in the acid.

But, the resulting sand is still far from being as clean and pure as the sand obtained from the white sand beds mentioned above. The iron content still runs as high as 0.1%, that is, one tenth of one per cent.

It is therefore, the object of this invention to provide a process whereby the local sand beds mentioned may be treated and may be brought to substantially the same degree of purity and of freedom from iron as the natural white sand mentioned.

Microscopic examination of the sand that has been treated and which still contains 0.1% of iron shows that many of the sand particles are not separate grains, but are composed of several individual sand grains, which are adhering to each other to form sand grain groups. These groups of sand grains often contain iron compounds which apparently lie between and cement together the adjoining sand grains. In this condition the washing as carried on can not wash away the contained iron and the acid leach is not able to reach and dissolve it.

It is possible that if strong enough acid were used the iron held between the associated sand grains might in time be dissolved. But, acid of such strength would cost too much, and would make the total cost of the treated sand practically equal to that of the white sand when shipped in, and the freight paid.

If the separate sand grains are pulverized, the resulting fines cause trouble in glass manufacture as they form masses difficult to break up and distribute, and this tends to make glass lacking in uniformity. Or a large wastage of sand is caused by screening out the fines, or by classification, since for glass manufacture the sand should pass through as 20 mesh screen and fail to pass through a 100 mesh screen.

Pulverizing the separate grains also prevents proper leaching action.

I have found that the sand grain groups may be broken up without crushing the individual grains by passing them between two or more surfaces, one of which may be hard, and one or all of which may be relatively soft.

When the sand containing iron is passed through such a disassociation device, the sand groups are all broken up into separate grains without pulverizing the grains, and at least part of the iron is rubbed off. The leaching acid may then reach and dissolve the remaining compounds of iron.

Such sand, after leaching, contains as little as 0.02% of iron oxide and hence is practically as pure as the natural white sand beds mentioned.

My process, therefore, comprises breaking up the sand grain groups by using a relatively hard and one or more relatively soft surfaces, or two or more surfaces relatively soft, then leaching the sand with an acid, and then washing the leached sand.

Separating the sand grain groups can not be done without crushing the individual grains where the surfaces used are metal to metal. This I have proved by many tests and experiments.

Under some conditions and with some sands, it may be that several washings, disassociations and leaching operations may be required, as may also desliming, dewatering, classifying or screening at various stages be needed.

But these are only variations of the essence of my invention, which variations may even include variation in the sequence of these operations, always provided that the acid leaching occurs subsequent to or in conjunction with the separation of the grouped sand grains into uncrushed separate grains.

The use of magnetic or electrostatic separation devices or processes may also be used one or more times in the particular sequence of operations desired, and the final removal of the iron down to the minimum will still be accomplished by the acid leach after or during the sand group separation into uncrushed separate grains.

From cost consideration, the acid used will, of course, be as weak as possible, as long as the desired results are obtained.

During the leaching operation the sand may be piled in tanks or vats and exposed to the air so that the excess water will evaporate, leaving a strong acid to act upon the iron compounds.

Having now described my process, what I claim as new, and desire to protect by Letters Patent, is as follows:—

1. A process for the purification of sand for glass manufacture including the separation of the grouped grains into separate uncrushed grains by means of resiliently applied mechanical rubbing of the grouped grains and the subsequent acid leaching of the sand.

2. A process for the purification of sand for glass manufacture including separating the grouped sand grains into separate uncrushed grains by means of resiliently contacting mechanical rubbing of the grouped grain clusters, acid leaching of the sand, and washing of the leached sand.

3. A process for the purification of sand including the separation of the grouped sand grains without crushing the individual grains by passing the sand between two or more surfaces, one of which is of rubber and only one of which is relatively hard, and acid leaching of the sand.

4. A process for the purification of sand including the separation of the grouped sand grains into separate uncrushed grains by passing the sand between two or more surfaces one of which is of rubber and one of which is relatively hard, acid leaching the sand, and washing of the sand.

5. A process for the purification of sand which includes washing of the sand, separation of the grouped sand grains into separate uncrushed grains by means of mechanical rubber rubbing of the grouped grain clusters and acid leaching of the sand.

6. A process for the purification of sand which includes the separation without crushing of the grouped sand grains, desliming or classifying the uncrushed grains, dewatering, adding acid, leaching and allowing the excess water to evaporate, washing, dewatering and drying.

7. A process for the purification of sand, which includes separation of the grouped sand grains into separate uncrushed grains, desliming or classifying the uncrushed grains, rubbing the grains without crushing, dewatering, adding acid, leaching and allowing the excess water to evaporate, washing, dewatering and drying.

8. A process for the purification of sand, which includes separating the grouped sand grains, desliming or classifying the uncrushed grains, dewatering and adding acid, leaching and allowing the excess water to evaporate, rubbing without crushing the grains in water, dewatering and drying.

9. A process for the purification of sand which includes separation of the grouped sand grains by passing them between two or more surfaces, one or all of which are relatively soft, acid leaching of the sand, permitting excess water to evaporate to concentrate the acid used, washing the sand, drying the sand, and subjecting the sand to a process in which advantage is taken of the difference in magnetic susceptibility of the various separated grains.

10. A process for the purification of sand for glass manufacture including the separation of the grouped grains into separate uncrushed grains and the subsequent acid leaching of the sand by the use of a dilute acid which is brought to the concentrated condition by the evaporation of the excess water and then washing out the water soluble compounds.

11. A process for the purification of sand including the separation of the grouped sand grains without crushing the individual grains by passing the sand between two or more surfaces only one of which is relatively hard, and acid leaching of the sand by mixing with it a dilute acid and allowing the excess water to evaporate, and then washing out the water soluble compounds.

12. A process for the purification of sand which includes separation of the grouped sand grains by passing the sand between two or more surfaces, one or all of which are relatively soft, and acid leaching of the sand by mixing it with a dilute acid, allowing the excess water to evaporate and thereby leave a strong, concentrated acid to act on the sand, and washing out the water soluble compounds.

THEODORE EARLE.